United States Patent [19]

Fleuren et al.

[11] Patent Number: 5,376,301
[45] Date of Patent: Dec. 27, 1994

[54] SUDS-CONTROLLING COMPOSITION FOR AQUEOUS COMPOSITIONS INCLUDING SURFACTANTS

[75] Inventors: Robert H. M. Fleuren, Copenhagen, Denmark; Jacqueline L'Hostis, Woluwe-Saint-Lambert, Belgium; Elizabeth F. Mallen, Brussels, Belgium; Franck A. D. Renauld, Gistoux, Belgium

[73] Assignee: Dow Corning S.A., Seneffe, Belgium

[21] Appl. No.: 13,878

[22] Filed: Feb. 5, 1993

Related U.S. Application Data

[63] Continuation-in-part of Ser. No. 994,393, Dec. 21, 1992.

[30] Foreign Application Priority Data

Dec. 21, 1991 [GB] United Kingdom ............... 9127178

[51] Int. Cl.$^5$ ............... B01D 19/04; C11D 1/82; C11D 9/36
[52] U.S. Cl. ............... 252/174.15; 252/121; 252/173; 252/321; 252/358; 252/550; 252/DIG. 14
[58] Field of Search ............... 252/321, 358, 174.15

[56] References Cited

U.S. PATENT DOCUMENTS

| | | | |
|---|---|---|---|
| 3,235,509 | 2/1966 | Nitzsche et al. | 252/358 |
| 3,280,160 | 10/1966 | Bailey | 252/351 X |
| 3,746,653 | 7/1973 | Churchfield | 252/321 |
| 3,984,347 | 10/1976 | Keil | 252/321 |
| 4,101,442 | 7/1978 | Rosen | 252/358 |
| 4,104,186 | 8/1978 | Caffarel et al. | 252/358 X |
| 4,395,352 | 7/1983 | Kulkarni et al. | 252/321 |
| 4,514,319 | 4/1985 | Kulkarni et al. | 252/321 |
| 5,153,258 | 10/1992 | Nakahara et al. | 524/588 |

FOREIGN PATENT DOCUMENTS 0217501 4/1987 European Pat. Off. .

*Primary Examiner*—Richard D. Lovering
*Attorney, Agent, or Firm*—James L. DeCesare

[57] ABSTRACT

A suds-controlling composition which comprises 100 parts by weight of a silicone antifoam which has a liquid branched polyhydrocarbyl siloxane material having at most 2 mole % branching and at least 2 trifunctional or tetrafunctional siloxane units, a finely divided hydrophobic filler, and from 75 to 900 parts by weight of a polyorganosiloxane polyoxyalkylene copolymer can be used as a stable suds-controlling composition for aqueous surfactant compositions, especially liquid detergents.

16 Claims, No Drawings

SUDS-CONTROLLING COMPOSITION FOR AQUEOUS COMPOSITIONS INCLUDING SURFACTANTS

This is a continuation-in-part of copending application Ser. No. 07/994,393 filed on Dec. 21, 1992 pending.

This invention relates to suds-controlling compositions which are useful in aqueous surfactant compositions. They also relate to aqueous surfactant compositions comprising said suds-controlling compositions showing improved stability particularly to liquid detergent compositions.

Aqueous surfactant compositions are used in a variety of applications. Such applications include hard surface cleaners, textile scouring compositions, carpet cleaners, general industrial and domestic cleaning compositions, laundry detergent compositions and cleaning and waxing compositions. In many of these applications it is desired to control the amount of foam generated, for example during the washing action in front-loading washing machines, or in the rinsing stage of a textile laundry operation or a floor cleaning operation. A number of antifoam or foam control compounds have been developed and suggested for use in such aqueous surfactant compositions. One particularly useful type of antifoam or foam control compound is based on silicone polymers, preferably in the presence of silica particles. The present invention is especially concerned with providing a suds-controlling composition which will be supplied in an aqueous surfactant composition, e.g. a liquid detergent composition as opposed to those which are supplied as a powder composition, intended for eventual use in an aqueous medium e.g. in a domestic washing machine.

British patent application 1 544 736 describes a concentrated, essentially homogeneous, low-sudsing liquid detergent composition comprising apart from nonionic and anionic surfactants an effective amount, preferably from 0.01% to 5% by weight based on the total weight of the composition of a self-emulsifiable suds-controlling agent, comprising a silicone suds controlling agent and an emulsifier for the silicone suds-controlling agent. The preferred emulsifiers used in the self-emulsifiable suds-controlling agents are said to be typically represented by the formula $R_aSiY_{4-a}$, wherein a is from 0 to 3, R is a $C_{1-30}$ alkyl or a group of the formula —R'—(OR')$_b$OR", wherein R' is alkylene, b is from 1 to 100 and R" is a capping group, and Y is a group of the formula [—OSi(R)$_2$—]$_c$—OSiR$_3$, wherein R is as above and c has a value of from 1 to 200, at least one R group in the compound having the formula —R'—(OR')$_b$OR". The silicone suds-controlling agent are described as siloxanes having the general structure —[SiO(RR$^2$)—]$_x$— wherein x is from 20 to 200 and R and R$^2$ are each alkyl or aryl, either singly or in combination with various solid materials such as silica aerogels and xerogels and hydrophobic silicas of various types. Another type of suds-controlling agent comprises a silicone fluid, a silicone resin and silica. Silicone resins are described as 3-dimensional polymers arising from the hydrolysis of alkyl trichlorosilanes. Such suds-controlling agents have been described in U.S. Pat. No. 3,455,839. The silicone resin materials used, are intended to react with the silanol groups of the silica, in order to render its surface hydrophobic.

In U.S. Pat. No. 4,395,352 a solution is sought for efficient antifoams in difficult-to-defoam aqueous systems e.g. those containing high concentrations of ionic surfactants. It is proposed to use a composition comprising a polydimethylsiloxane having a high viscosity (5,000 to 30,000 mm$^2$/s), a finely divided hydrophobic silica and a siloxane oxyalkylene block copolymer. Although it is stated that the polydimethylsiloxane may contain other units such as monomethylsiloxane units and SiO$_2$ units in minimal amounts of up to 10 mole %, preferably at levels below 0.2 mole %, the examples and general description teach the preferred use of linear polydimethylsiloxanes. Nothing in the publication suggests which of these materials would need to be used for improved stability in liquid surfactant solutions, especially detergent compositions. Indeed all teaching points towards the use of purely linear siloxanes.

We have found that when such suds-controlling agents are added to aqueous surfactant compositions, especially of an unbuilt and unstructured type, the compositions, though efficient in the controlling of foam when initially mixed with the suds-controlling agent very often do not retain their efficiency in controlling the foam for a sufficiently long time to enable long term storage. This is not because the suds-controlling agent loses its intrinsic efficiency, but because the suds-controlling agents are not stable in the surfactant composition, and are thus not evenly dispersed throughout said composition. This is often due to either coalescence of the suds-controlling agent droplets, which were dispersed in the aqueous surfactant composition, or to phase separation resulting in either creaming of sedimentation. Coalescence is usually caused by preferential solubility of the emulsifiers, resulting in the dispersed particles losing the stabilising presence of emulsifiers at the interface between the suds-controlling agent and the surfactant solution. The latter finds its cause often in the differing specific gravities of the internal and external phases. By not having correct gravity adjustment of the suds-controlling agent, in order to match as closely as possible the specific gravity of the liquid surfactant compositions, the separation problem becomes worse.

In U.S. Pat. No. 4,597,894 there is disclosed a self-emulsifiable silicone antifoam composition comprising 100 parts of an organopolysiloxane having polyoxyalkylene moieties and perfluoroalkyl groups and 0.1 to 200 parts by weight of a perfluoroalkyl containing organopolysiloxane. The composition is stated to be readily emulsified to give a stable aqueous emulsion useful to defoam in various media. No indication of its stability is given, especially not in detergent compositions which are unstructured or unbuilt. However, perfluoroalkyl components are very expensive and there is a need to promote stable systems with standard organopolysiloxanes using hydrocarbon substituents on the silicon atoms.

Stabilising of compounds in liquid detergent compositions by different means is also known. For example E.P. specification 81 908 describes low-foaming detergent compositions consisting of a micellar structured liquid and a liquid polysiloxane antifoaming agent. Stabilisation occurs by keeping components in homogeneous suspension by the structure of the micellar system. The preferred compositions contain 6 to 15% by weight of a mixture of anionic sulfonate or sulfate detergents, alkali metal soaps of $C_{12-18}$ fatty acid, and nonionic detergents and preferably 18–35% by weight of a solid detergency builder (e.g. Na tripolyphosphate). The low-foaming detergent composition has a non-Newtonian structure. E.P. 126 500 describes similar detergent compositions which are micellar structured liquids. However, there is a need to find different stabilisation methods, especially for non-structured and unbuilt liquid surfactant compositions.

Nothing in the prior art indicates how best such improvement in stability would be obtained. There is particularly no mention that the use of special branched polyorganosiloxane materials in the antifoam instead of linear organosiloxane polymers might improve the stability in liquid surfactant compositions, especially of the unbuilt and unstructured type.

We have now surprisingly found that if the suds-controlling composition comprises a mixture of certain polyoxyalkylene polysiloxane copolymers and a silicone antifoam which consists of certain branched siloxane polymers and solid particles, a much more stable system is provided when mixed with an aqueous surfactant composition. Stable compositions as used herein include those in which an easily redispersed separation occurs, but without any coalescence or aggregation, which is irreversible by agitation.

According to a first aspect of the invention there is provided a suds-controlling composition which is liquid at 25° C. comprising (a) 100 parts by weight of a silicone antifoam which consists essentially of (i) a liquid branched polyhydrocarbyl siloxane material having a maximum of 2 mole % branching wherein at least 50% of all units present have the general formula $R_2$—Si—$O_{2/2}$ wherein R denotes a monovalent hydrocarbon group having up to 24 carbon atoms and wherein at least 2 units have the general structure R—Si—$O_{3/2}$ or Si—$O4/2$, any other units having the general formula

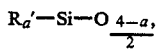

$$R_a'-Si-O_{\frac{4-a}{2}},$$

wherein a has a value of from 0 to 3 and R' denotes a group R or a hydrogen or hydroxyl group, and (ii) a finely divided filler having its surface rendered hydrophobic, and (b) from 75 to 900 parts by weight of a polyorganosiloxane polyoxyalkylene copolymer, which is neither fully soluble in an aqueous surfactant solution nor fully soluble in the liquid polyorganosiloxane (a)(i).

Silicone antifoams which are useful as part (a) of the suds-controlling composition of the invention, are known in the art and have been described in a number of publications.

G.B. 639 673 describes an antifoam composition comprising an intimate mixture of a silica aerogel and a viscous but flowable methyl siloxane polymer containing an average of from 1.75 to 2 carbon atoms per atom of silicon and having semi-rubbery characteristics. It is stated that the methyl siloxane polymer retains its ability to flow at room temperatures. Several methods of manufacturing the methyl polysiloxane are described, including partial oxidation of non-rubbery liquid methyl siloxane polymers, cohydrolysis and condensation of hydrolysable mono- and dimethyl silanes or polymerisation of non-rubbery liquid methyl siloxane in the presence of an acid or alkali catalyst. It is clear from this that branched polysiloxane materials are obtained.

E.P. 31 532 describes an antifoam composition which is prepared by mixing a liquid polydimethylsiloxane and a lightly crosslinked polysiloxane resin with a molecular weight of from 1000 to 10000 and having 0.1 to 10% by weight of hydroxyl groups, and heating it up with a catalyst and optionally a solvent till the viscosity is at least 200 mPa.s at 20° C., followed by mixing and heating the resultant compound with silica aerogel which has been silanised. The silicone block co-polymers thus obtained are stated to give improved storage stability in powder detergents.

E.P. 217 501 describes improved foam control compositions which comprise a liquid siloxane component and a finely divided filler having its surface rendered hydrophobic. The liquid siloxane component has a certain minimum viscosity and is obtained by mixing and reacting polydiorganosiloxanes having triorganosiloxy end groups, polydiorganosiloxanes having at least one terminal silanol group and an organopolysiloxane resin comprising monofunctional and tetrafunctional siloxanes units and at least one silanol group.

E.P. 273 448 describes a foam suppressing composition which is produced through free-radical polymerisation of mixtures of polydiorganosiloxanes, silica and free radical polymerisation initiators. Some of the compositions described add pendant vinyl modified silicone oil, which would result in a branched siloxane fluid.

German patent application DE 38 05 661 describes a method of making improved foam control agents by oxidation of linear polydimethylsiloxanes in oxygen at high temperatures in the presence of an organic peroxide, followed by mixing in silica particles and the further reaction with a low molecular weight silane or silazane.

Our copending application G.B. 9115590.3 describes a method for making a branched organopolysiloxane antifoam component which comprises bringing about a hydrosilylation reaction between a vinyl end-blocked polydiorganosiloxane and a volatile low viscosity organohydrosiloxane in the presence of a noble metal catalyst.

Although silicone antifoams which are useful as part (a) of the suds-controlling compositions of the invention are known, there is no indication in any of the prior art that they would be particularly useful to form stable ingredients in certain aqueous surfactant compositions. There is in particular no indication that they would give improved stability in liquid detergent compositions, which are unbuilt and unstructured, when combined with certain polyoxyalkylene polyorganosiloxane copolymers.

The nature of the liquid branched polyhydrocarbyl siloxane material is not critical provided it has at most 2 mole % of branching. As branched polyhydrocarbyl siloxanes are preferably made by reacting a reactive polymer with reactive crosslinking units, as explained above, a loose network is preferably formed in which polyhydrocarbyl siloxane portions are linked to each other. If this network is too dense, e.g. as a result of higher mole % of branching, the resulting branched siloxane is no longer liquid and hence of no use as an antifoam for the present invention. If, on the other hand, there is insufficient branching, e.g. less than 0.1 mole % the resulting polymer will not form a network but the crosslinking units will merely result in chain extension. It is accordingly required that from 0.1 to 2 mole % branching is present. In order to maintain the liquid nature the polymer size linking two branching points should be at least 250 siloxane units for the majority, preferably at least 70%, of the linking polymers.

Preferably such polymers should be at least 400 siloxane units long. With mole % branching is meant the number of branching points, especially siloxane units in the branched polymer where at least 3 of these linking siloxane polymers come together for every 100 siloxane units in the branched polyhydrocarbyl siloxane. Preferably the branched polyhydrocarbyl siloxane has from 0.2 to 0.8 mole % branching.

It is also important that at least 50% of all units present have the formula $R_2SiO_{2/2}$ and at least two units have either the formula $RSiO_{3/2}$ or the formula $SiO_{4/2}$. Preferably at least 80% of all units have the formula $R_2SiO_{2/2}$, most preferably at least 90%. It is preferred that all other units are either units of the formula $RSiO_{3/2}$ or $SiO_{4/2}$. These other units may be present as individual units in the siloxane chains, or they may be present as little clusters, from which one or more siloxane polymers extend. Thus a very loose network is formed of polyhydrocarbyl siloxane chains giving a liquid material. Each group R present in the branched polyhydrocarbyl siloxane material may be an aliphatic or aromatic hydrocarbon group having up to 24 carbon atoms, preferably up to 18 carbon atoms. Suitable groups include alkyl, aryl, alkaryl, aralkyl, alkenyl or alkynyl groups, for example methyl, ethyl, dodecyl, octadecyl, phenyl, vinyl, phenylethyl or propargyl. Preferably at least 60% of all R groups are methyl or phenyl groups, more preferably at least 80%. It is most preferred that substantially all R groups are methyl or phenyl groups, especially methyl groups. Units of the general formula

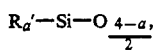

$$R'_a\text{—Si—O}_{\frac{4-a}{2}},$$

wherein a has a value of from 0 to 3 and R' denotes a group R or a hydrogen or hydroxyl group, may also be present, but they are preferably kept to a minimum. The presence of R' groups which are different from R, would generally only occur where the branched polyhydrocarbyl siloxane material is prepared using organosilicon compounds which have silicon-bonded R' groups present. Suitable branched siloxane polymers may be made according to any one of the methods described in the patent applications G.B. 639 673, E.P. 31 532, E.P. 217 501, E.P. 273 448 or DE 38 05 661, which are hereby included by reference.

The finely divided filler (ii) which is used in combination with the branched polyhydrocarbyl siloxane (i) in order to form the silicone antifoam (a) may be any one of the well known filler materials used in the art. Suitable fillers are described in a number of patent specifications and include $TiO_2$, $Al_2O_3$, aluminosilicates, quartz and $SiO_2$ with a surface area as measured by BET measurement of at least 50 $m^2/g$. Preferred fillers are silica fillers which can be made according to any of the standard manufacturing techniques for example thermal decomposition of a silicon halide, decomposition and precipitation of a metal salt of silicic acid, e.g. sodium silicate and a gel formation method. Suitable silicas for use in an antifoam include therefore fumed silica, precipitated silica and gel formation silica. The average particle size of these fillers may be such that the diameter ranges form 0.1 to 20$\mu$, preferably from 0.5 to 5$\mu$, most preferably 1 to 2.5$\mu$. A mixture of fillers may be used and this can be particularly beneficial where the specific gravity of the antifoam can be adjusted to match the specific gravity of the liquid surfactant composition into which the suds-controlling compositions according to the invention will be mixed.

The surface of the filler particles is rendered hydrophobic in order to make the antifoam more efficient in aqueous systems. Rendering the filler particles hydrophobic may be done either prior to or after dispersing the filler particles in the liquid polyhydrocarbyl siloxane component. This can be effected by pretreatment of the filler particles with fatty acids, reactive silanes or reactive siloxanes. Examples of suitable hydrophobing agents include stearic acid, dimethyldichlorosilane, trimethylchlorosilane, hexamethyldisilazane, hydroxyl end-blocked or methyl end-blocked polydimethylsiloxanes, siloxane resins or mixtures of two or more of these. Other hydrophobing agents may also be used, but the above exemplified materials are the most effective. Fillers which have already been treated with such compounds are commercially available from a number of sources. Alternatively, the surface of the filler may be rendered hydrophobic in situ, i.e. after the filler has been dispersed in the liquid polyhydrocarbyl siloxane material. This may be effected by adding to the liquid polyhydrocarbyl siloxane component prior to, during or after the dispersion of the filler, an appropriate amount of a hydrophobing agent of the kind described above as reactive silanes or siloxanes, and heating the mixture sufficiently to cause reaction, e.g. a temperature of at least 40° C. It is even possible to add the fillers and the hydrophobing agent to the ingredients used to make the liquid branched polyhydrocarbyl siloxane material, and make said polyhydrocarbyl siloxane at the same time as render the surface of the filler hydrophobic.

The quantity of hydrophobing agent to be employed will depend for example on the nature of the agent and of the filler, and will be evident or ascertainable by those skilled in the art. Sufficient hydrophobic agent should be employed to endow the filler with at least a discernible degree of hydrophobicity. The amount of filler used is not critical and may be in the range of form 2 to 20% by weight of the total antifoam. Preferably form 3 to 15% is used.

The silicone antifoam compound (a) which is useful in a suds controlling composition according to the invention is preferably a flowable compound even though the viscosity may be very high, bordering on the elastomeric. It is particularly preferred that the silicone antifoam has a viscosity at 25° C. of from 500 to 50,000 mPa.s, more preferably from 1,000 to 40,000, especially 3,000 to 35,000 mPa.s. Most preferably a suitable silicone antifoam will have a viscosity of from about 5,000 to 30,000 mPa.s. This viscosity will result from a number of factors, including starting with the appropriate polyhydrocarbyl siloxane material (i), adding the appropriate amount of filler (ii) and using a sufficient amount of shear to mix the two components together. It will be clear to a person skilled in the art how these factors can be used to obtain a silicone antifoam of the desired viscosity.

The second essential ingredient of the suds-controlling composition according to the invention is a polyorganosiloxane polyoxyalkylene copolymer (b). This copolymer serves as a kind of dispersing aid for the silicone antifoam and as an emulsifier for the silicone antifoam when dispersed in an aqueous surfactant composition, e.g. liquid detergent composition.

Suitable copolymers have been described in a number of publications and are generally well known in the art.

Suitable polyorganosiloxane polyoxyalkylene copolymers have a number of units X of the general formula

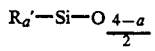

and at least one unit Y of the general formula

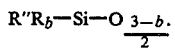

R' denotes a monovalent hydrocarbon group having up to 24 carbon atoms, a hydrogen atom or a hydroxyl group, preferably R as previously described, including preferred values for R and a has a value of 0, 1, 2 or 3. R denotes a hydrocarbon group having up to 24 carbon atoms, preferably those values as denoted above as preferred values for R. R" denotes a group of the general formula A—(OZ)$_c$—B, wherein Z is a divalent alkylene unit having from 2 to 8 carbon atoms, A denotes a divalent hydrocarbon radical having from 2 to 6 carbon atoms, optionally interrupted by oxygen, B denotes a capping unit and c is an integer with a value of from 3 to 30. It is preferred that A is a divalent alkylene unit preferably having 2 to 4 carbon atoms, e.g. dimethylene, propylene or isobutylene. Z is preferably a divalent alkylene unit having 2 or 3 units, e.g. dimethylene or isopropylene. B may be any of the known end-capping units of polyoxyalkylene groups, e.g. hydroxyl, alkoxy, aryloxy, acyl, sulfate, phosphate, anhydride or mixtures thereof, most preferably hydroxyl, alkoxy or acyl.

Units X and Y may be the majority of units in the copolymer, but preferably they are the only units present in the copolymer. They may be linked to each other in a way to form random copolymers or block copolymers. The units Y may be distributed along the siloxane chain of the copolymer or they may be placed at one or both ends of such siloxane chain. Suitable copolymers will therefore have one of the following structures, wherein X' denotes one or more units X and Y' denotes one or more units Y:X'Y', Y'X'Y', X'Y'X', Y'(X'Y')$_e$, Y'(X'Y')$_e$, X', X'(Y'X')$_e$ or any one of the above structure wherein one or more Y' groups have divalent polyoxylakylene units which are linked at either end to a siloxane unit, thus forming a type of crosslinked polyorganosiloxane polyoxyalkylene unit. The value of e is not important, provided the copolymer satisfies the conditions of solubility laid down. Suitable copolymers have been described for example in Patent Specifications G.B. 1 023 209, G.B. 1 554 736, G.B. 2 113 236, G.B. 2 119 394, G.B. 2 166 750, G.B. 2 173 510, G.B. 2 175 000, E.P. 125 779, E.P. 212 787, E.P. 298 402 and E.P. 381 318.

It is preferred that the polyorganosiloxane polyoxyalkylene copolymer has a substantially linear siloxane backbone, i.e. that the value of a is 2 and b is 1 for the majority of units present in the copolymer. This will result in a so-called ABA type polymer (i.e. Y'X'Y' or X'Y'X') or in a rake type polymer (i.e. Y'(X'Y')$_e$ or X'(Y'X')$_e$). In the former units Y will be preferably situated at each end of the siloxane chain, while in the latter units X and Y are dispersed along the siloxane chain, with the oxyalkylene units pending from the chain at certain intervals. More preferred are those copolymers which have the general formula

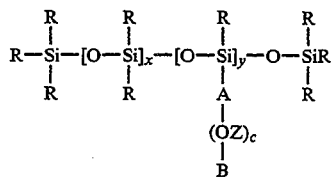

R in these more preferred copolymers may denote any alkyl or aryl group having up to 18 carbon atoms, more preferably 6. Particularly preferred are methyl, ethyl or phenyl groups. Especially preferred are those copolymers wherein at least 80% of all R groups in the copolymer, most preferably substantially all R groups are methyl groups. A in these more preferred copolymers denotes a $C_2$ or $C_3$ alkylene unit, most preferably propylene or isopropylene. Z preferably denotes a dimethylene group for the majority of Z groups present in the copolymer. More preferably at least 70% of all Z groups are dimethylene groups, most preferably all Z groups, making each polyoxyalkylene portion a polyoxyethylene portion. B preferably denotes a hydroxyl group or an acetyl group. The values of x, y and c are chosen thus that the copolymer is not fully soluble in an aqueous surfactant solution or not fully soluble in the liquid polyorganosiloxane material. It is therefore preferred to balance the hydrophobic nature of the copolymer, which is determined to a large extent by the value of x, with the hydrophilic nature, which is determined to a large extent by the value of y and c. E.g. if the value of x is large, a long siloxane chain is formed, which will encourage solubility of the copolymer in the organopolysiloxane material (i). This may be balanced by increasing the amount of units having oxyalkylene groups (value of y) and by the size of the polyoxyalkylene groups (value of c, especially where Z is dimethylene).

For best stability results, polyorganosiloxane polyoxyalkylene copolymers are to be selected according to the surfactant composition. This may be influenced by the alkalinity of the composition, the hydrophilic/lipophilic balance etc. For a majority of aqueous surfactant compositions, particularly preferred polyorganosiloxane polyoxyalkylene copolymers will be those where the value of x+y is in the range of from 20 to 700, more preferably from 50 to 500, most preferably 80 to 350. The preferred ratio of y/x+y is from 0.02 to 0.15, more preferably 0.03 to 0.08 most preferably 0.03 to 0.06. The value of c is preferably in the range from 4 to 40, more preferably 5 to 20, most preferably 7 to 15. A particularly useful copolymer is the one wherein x+y has a value of about 100, y/x+y has a value of about 0.06 and c has a value of 12, provided all Z units are dimethylene units.

Where higher molecular weight polyorganosiloxane polyoxyalkylene copolymers are preferred, e.g. those which are solid, it is preferred to mix these copolymers with a diluent, e.g. a linear or cyclic polydiorganosiloxane polymer of very low viscosity. Such polymers are known and are described in more detail under optional ingredients below.

Polyorganosiloxane polyoxyalkylene copolymers which are useful in suds controlling compositions according to the invention are known in the art, have been described in a number of patent specifications, as described above, and many of them are commercially available. They may be made by a variety of methods, which have also been described or referenced in the above mentioned specifications, which are hereby included by reference. One particularly useful way of making suitable copolymers is by reaction of polyorganosiloxanes having silicon-bonded hydrogen atoms with appropriate allylglycols (allyl-polyoxyalkylene polymers) in the presence of a noble metal catalyst. A hydrosilylation reaction will ensure the addition reaction of the allyl group to the silicon atom to which the hydrogen atom was bonded.

The suds-controlling composition comprises at least 75 parts by weight of the polyorganosiloxane polyoxyalkylene copolymer (b) for every 100 parts by weight of the silicone antifoam (a) and at most 900 parts (b) per 100 parts of (a). Preferably there are at least 85 to 300 parts of copolymer (b) for every 100 parts of antifoam (a), most preferably from 100 to 150, particularly 100 to 120 parts of (b) for every 100 parts of (a). The components (a) and (b) may be mixed together in any known way, but are preferably mixed together using a reasonable amount of shear, so as to ensure a proper dispersion of the antifoam in the copolymer. This will also encourage a proper dispersion when the suds-controlling composition is mixed into a detergent composition.

Apart from the two essential ingredients, a suds-controlling composition according to the present invention may also include certain amounts of other components. Such additional optional ingredients may include organic foam controlling compounds, e.g. mineral oil, linear organopolysiloxane fluids, e.g. polydimethylsiloxane materials and alkyl methyl silicone, organic polymers soluble in silicone e.g. polyisobutene, polyisopentene, cyclic organopolysiloxane fluids, e.g. cyclic octamethyltetrasiloxane and cyclic decamethylpentasiloxane, preservatives, pH stabilisers and extra hydrophilic or hydrophobic filler materials e.g., clays, quartz. The amount of these materials may be quite high, and especially where the linear or cyclic organopolysiloxanes are concerned, as much as 200 to 400 parts by weight may be added to the composition e.g. 50% by weight of total suds-controlling composition. The addition of these ingredients may be used to adjust the specific gravity of the suds-controlling composition so that it matches that of the aqueous surfactant composition, e.g. the detergent composition.

The suds-controlling composition according to the present invention is particularly useful in controlling foam of aqueous surfactant compositions, more particularly of liquid detergent compositions. It is particularly useful in those detergent compositions which have a strong tendency to foaming, for example hard surface cleaners and liquid laundry detergent compositions. The latter are of particular interest, as there has been a search for a stable and efficient suds-controlling agent in such compositions, particularly where unbuilt and unstructured detergent compositions are concerned.

According to the invention there is provided in another aspect an aqueous surfactant composition, e.g. a liquid detergent composition comprising
(A) from 10 to 50 parts by weight of a nonionic surfactant,
(B) from 10 to 50 parts by weight of an anionic surfactant,
(C) sufficient of a suds-controlling composition comprising
  (a) 100 parts by weight of a silicone antifoam which consists essentially of (i) a liquid branched polyorganosiloxane material having a maximum of 2 mole % branching wherein at least 50% of all units present have the general formula $R_2$—Si—$O_{2/2}$, wherein R denotes a monovalent hydrocarbon group having up to 24 carbon atoms and wherein at least 2 units have the general structure R—Si—$O_{3/2}$ or Si—$O_{4/2}$, any other units having the general formula

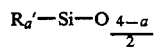

wherein a has a value of from 0 to 3 and R' denotes a group R or a hydrogen or hydroxyl group, and (ii) a finely divided filler having its surface rendered hydrophobic, and
  (b) from 75 to 900 parts by weight of a polyorganosiloxane polyoxyalkylene copolymer, which is liquid at ambient temperature, and which is neither fully soluble in the surfactant composition nor fully soluble in the liquid polyorganosiloxane (a)(i) to give a silicone antifoam content of from 0.01 to 5% by weight based on the total weight of the liquid detergent composition, and
(D) water.

Aqueous surfactant composition are well known and have been described in a number of patent specifications. Examples of such specifications include G.B. 1 554 736, G.B. 2 078 246, G.B. 2 132 629, G.B. 2 151 252, G.B. 2 158 453, E.P. 205 088, E.P. 221 774, E.P. 328 182, E.P. 346 111, U.S. Pat. Nos. 4,110,262, 4,147,649, 4,798,679, 4,992,196 and 5,035,832, which are hereby included by reference. They may be built or unbuilt, structured or unstructured. Preferred aqueous surfactant compositions according to the invention are unbuilt and unstructured compositions.

Most preferred are unbuilt and unstructured liquid detergent compositions. Typically a liquid detergent composition comprises a nonionic surfactant, for example condensation products of alkylene oxide with organic hydrophobic compounds, e.g. condensation products of ethylene oxides and alkyl phenols, condensation products of aliphatic alcohols and ethylene oxide, condensation products of ethylene oxide and propylene oxide, the condensation product of ethylene oxide and the product of reaction of propylene oxide and ethylene diamine, preferably the condensation products of poly (1-20) oxyethylene and primary and secondary $C_{9-18}$ alcohols. A typical aqueous surfactant composition also comprises anionic surfactants, e.g. alkyl benzyl sulfonates, alkyl glyceryl ether sulfonates, alkyl ether sulfates and sulfonated fatty acids. Other surfactants may also be included, e.g. semi-polar, ampholytic and zwitterionic surfactants, such as water soluble amine or phosphine oxides containing an alkyl moiety and optionally a hydroxyalkyl moiety, aliphatic derivatives of heterocyclic secondary and tertiary amines and derivatives of aliphatic quaternary ammonium, sulfonium and phosphonium compounds.

Other optional ingredients of aqueous surfactant compositions include alkanolamines, fatty acid corrosion inhibitors, alkali metal bases, solvents, especially alcohol-water mixtures, electrolyte salts, optical brighteners, enzymes, bleaching agents, colorants and antimicrobial agents. These compounds are all well known to the person skilled in the art.

The suds-controlling composition according to the invention may be introduced into the aqueous surfactant composition by any acceptable means. This may vary from mere mixing of the ingredients to applying high shear in order to establish a good dispersion of the suds-controlling composition in the aqueous surfactant composition. Better shear will result in smaller particle size of the suds-controlling compositions, and hence in a better stability of the total surfactant composition. It is, however, important that the suds-controlling agent is prepared separately, including at least the two essential ingredients (silicone antifoam and polyorganosiloxane polyoxyalkylene copolymer), and added to the surfactant composition as a single ingredient. It is preferred that the preparation or premixture of the silicone antifoam and the copolymer is aged slightly, e.g. for a few hours or a few days, prior to adding it to the surfactant solution. This is particularly useful for more viscous mixtures. The amount of suds-controlling composition will be as small as possible whilst ensuring a stable and efficient composition. Useful amounts depend on the surfactant composition but tend to be in the range of from 0.01 to 5% by weight of the total composition, preferably ensuring a silicone antifoam content of from 0.05 to 2% by weight based on the total weight of the composition, more preferably 0.1 to 1%.

There now follow a number of examples which illustrate the invention. All parts and percentages are by weight, unless otherwise stated.

PREPARATIONS

Polyorganosiloxane Polyoxyalkylene Copolymer 74.05 * x parts of a mixture of octamethyltetracyclosiloxane and decamethylpentasiloxane were heated up together with 60.05 * y parts of a short polymer of the formula $(CH_3)_3SiO[(CH_3)SiH-O]_n-Si(CH_3)_3$ wherein n is on average 12 and 162-(162*y/40) parts of hexamethyl disiloxane to a temperature of 55° C. under a nitrogen blanket. 0.1% w/w of trifluoromethane sulphonic acid was carefully added together with a few drops of water. The mixture was stirred for 5 hours at 70° C., and after cooling, neutralised with 0.5% w/w NaHCO₃. Filtration gave a siloxane of the general formula $(CH_3)_3-Si-O[(CH_3)_2SiO]_x-[(CH_3)HSiO]_y-Si(CH_3)_3$

* means multiplied by

The polymers were reacted with allyl polyethylene glycol of the formula 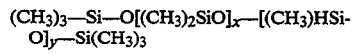$CH_2=CH-CH_2-(OCH_2CH_2)_z-OR$ in the presence of isopropanol and a platinum containing catalyst at 70° C., till the reaction was complete, which was followed by infra red spectroscopy of the presence of SiH groups. This was followed by removal of the volatile materials under reduced pressure.

The following copolymers were made:

TABLE I

|   | x + y | y | z | R |
|---|-------|---|---|---|
| A | 26 | 2 | 12 | acyl |
| B | 50 | 3 | 12 | acyl |
| C | 100 | 3 | 7 | OH |
| D | 100 | 3 | 12 | OH |
| E | 100 | 3 | 12 | acyl |
| F | 100 | 4 | 12 | acyl |
| G | 100 | 6 | 7 | OH |
| H | 100 | 6 | 7 | acyl |
| I | 100 | 6 | 12 | OH |
| J | 100 | 6 | 12 | acyl |
| K | 100 | 7 | 12 | acyl |
| L | 100 | 8 | 12 | acyl |
| M | 100 | 9 | 12 | acyl |
| N | 100 | 10 | 12 | acyl |
| O | 100 | 15 | 12 | acyl |
| P | 200 | 6 | 12 | acyl |
| Q | 295 | 5 | 7 | acyl |
| R | 295 | 5 | 12 | acyl |
| S | 350 | 11 | 7 | OH |
| T | 350 | 21 | 12 | acyl |
| U | 350 | 32 | 12 | acyl |
| V | 500 | 30 | 12 | acyl |

Silicone Antifoam

Two branched siloxane polymers (1 and 2) were made according to E.P. 217 501 by adding to a glass flask equipped with thermometer, stirrer, dropping funnel and inert gas supply, respectively 61.1 parts of a trimethylsiloxy endblocked polydimethylsiloxane having a viscosity at 25° C. of 1000 mm²/s and 64.3 parts of a trimethylsiloxy end-blocked polydimethylsiloxane having a viscosity at 25° C. of 50mm²/s, 30.5 and 32 parts respectively of a hydroxy end-blocked polydimethylsiloxane having on average about 900 silicon atoms per molecule and 3.2 and 3.4 parts respectively of a 70% solution in xylene of a polysiloxane resin having $(CH_3)_3SiO_{1/2}$ units and $SiO_2$ units in a ratio of from 0.5:1 to 1.2:1. The mixtures were stirred at room temperature till well mixed and then heated to 115° C. under nitrogen. When the mixture reached that temperature, 0.87 part of potassium silanolate were added and the temperature was held for a further 30 minutes. Then the mixture was allowed to cool to 40° C. and 0.046 part of glacial acetic acid were added and stirred to ensure neutralisation of the catalyst. A liquid branched siloxane polymer was obtained.

Silicone antifoam 1 was formed by mixing 95 parts of the first branched siloxane polymer with 5 parts of a hydrophobic silica, giving a viscosity of 20,000 mm²/s at 25° C. Silicone antifoam 2 was formed by mixing 98 parts of the second branched siloxane polymer with 2 parts of a hydrophobic silica, giving a viscosity of 10,000 mm²/s at 25° C. Silicone antifoam 3 was formed by mixing 97 parts of the first branched siloxane polymer with 3 parts of a hydrophobic silica, giving a viscosity of 30,000 mm²/s at 25° C. Silicone antifoam 4 was formed by mixing 95 parts of the first branched siloxane polymer with 5 parts of a hydrophobic quartz, giving a viscosity of 20,000 mm²/s at 25° C.

Two comparative silicone antifoams (C1 and C2) were also made in which only linear polydimethylsiloxane and hydrophobic silica was used. C1 was a higher density antifoam than C2.

Suds-Controlling Compositions

Suds-controlling compositions according to the invention were made by mixing amounts of polyorganosiloxane polyoxyalkylene copolymers of Table I with silicone antifoams 1, 2, 3 or 4, in amounts given in Table II below. The preparation was done by stirring the ingredients with a 4-bladed paddle stirrer at a speed which could vary from 200 to 600 rpm depending on the viscosity (highest possible speed was used, while avoiding that the mixture climbed up the shaft of the stirrer) for a period of up to 2 hours. Where indicated below a mixture of low viscosity siloxane materials were added (CS denotes a mixture of octamethylcyclotetrasiloxane and decamethylcyclopentasiloxane, and LS denotes a linear polydimethylsiloxane having a viscosity of less than 10mm²/s). The amounts are given in weight and the type of material indicated in brackets.

TABLE II

| Suds-Control Composition | Silicone Antifoam | Copolymer | Low Viscosity Silicone |
|---|---|---|---|
| SCC01 | 25 (1) | 25 (A) | — |
| SCC02 | 25 (1) | 25 (B) | 50 (CS) |
| SCC03 | 20 (1) | 30 (B) | 50 (CS) |
| SCC04 | 25 (1) | 25 (C) | — |
| SCC05 | 20 (1) | 30 (C) | — |
| SCC06 | 25 (3) | 25 (C) | — |
| SCC07 | 25 (1) | 25 (D) | 50 (CS) |
| SCC08 | 20 (1) | 30 (D) | 50 (CS) |
| SCC09 | 25 (1) | 25 (E) | — |
| SCC10 | 25 (1) | 25 (E) | 50 (CS) |
| SCC11 | 25 (3) | 25 (E) | — |
| SCC12 | 25 (1) | 25 (F) | — |
| SCC13 | 20 (1) | 30 (F) | 50 (CS) |
| SCC14 | 35 (1) | 65 (F) | 100 (CS) |
| SCC15 | 25 (1) | 25 (G) | — |
| SCC16 | 25 (1) | 25 (G) | 50 (CS) |
| SCC17 | 20 (1) | 30 (G) | 50 (CS) |
| SCC18 | 25 (1) | 25 (H) | 50 (CS) |
| SCC19 | 20 (1) | 30 (H) | 50 (CS) |
| SCC20 | 25 (1) | 25 (I) | 50 (CS) |
| SCC21 | 25 (1) | 25 (J) | — |
| SCC22 | 25 (1) | 25 (J) | 50 (CS) |
| SCC23 | 20 (1) | 30 (J) | 50 (CS) |
| SCC24 | 20 (1) | 30 (J) | 10 (CS) |
| SCC25 | 20 (1) | 30 (J) | 10 (LS) |
| SCC26 | 20 (2) | 30 (J) | — |
| SCC27 | 25 (1) | 25 (K) | 50 (CS) |
| SCC28 | 20 (1) | 30 (K) | 50 (CS) |
| SCC29 | 25 (1) | 25 (L) | — |
| SCC30 | 25 (1) | 25 (L) | 50 (CS) |
| SCC31 | 25 (1) | 25 (M) | 50 (CS) |
| SCC32 | 20 (1) | 30 (M) | 50 (CS) |
| SCC33 | 25 (1) | 25 (N) | — |
| SCC34 | 25 (1) | 25 (O) | — |
| SCC35 | 25 (1) | 25 (P) | 50 (CS) |
| SCC36 | 20 (1) | 30 (P) | 50 (CS) |
| SCC37 | 25 (1) | 25 (R) | 50 (CS) |
| SCC38 | 20 (1) | 30 (R) | 50 (CS) |
| SCC39 | 25 (1) | 20 (R) + 5 (U) | 50 (CS) |
| SCC40 | 25 (1) | 15 (R) + 10 (U) | 50 (CS) |
| SCC41 | 25 (1) | 10 (R) + 15 (U) | 50 (CS) |
| SCC42 | 25 (1) | 5 (R) + 20 (U) | 50 (CS) |
| SCC43 | 25 (1) | 25 (S) | — |
| SCC44 | 20 (4) | 30 (S) | — |
| SCC45 | 25 (1) | 25 (T) | — |
| SCC46 | 45 (1) | 55 (T) | — |
| SCC47 | 25 (1) | 25 (T) | 50 (CS) |
| SCC48 | 20 (1) | 30 (T) | 50 (CS) |
| SCC49 | 25 (1) | 25 (U) | 50 (CS) |
| SCC50 | 20 (1) | 30 (U) | 50 (CS) |
| SCC51 | 20 (1) | 30 (V) | 50 (CS) |

Comparative suds-controlling compositions were made by mixing comparative antifoams (C1, C2) with certain polysiloxane polyoxyalkylene copolymers as shown in Table IV below. Other comparative suds-controlling compositions were made by mixing antifoam (1) with comparative polysiloxane polyoxyalkylene copolymers X or Y as given in Table III below (x, y and z are as in Table I).

TABLE III

| | Comparative copolymers | | | |
|---|---|---|---|---|
| | x + y | y | z | R |
| X | 50 | 25 | 4 | acyl |
| Y | 100 | 24 | 12 | acyl |

TABLE IV

| Suds-Control Composition | Silicone Antifoam | Copolymer | Low Viscosity Silicone |
|---|---|---|---|
| SCC-C1 | 25 (C1) | 25 (T) | — |
| SCC-C2 | 25 (C2) | 25 (H) | 50 (CS) |
| SCC-C3 | 25 (C2) | 25 (J) | 50 (CS) |
| SCC-C4 | 25 (1) | 25 (X) | — |
| SCC-C5 | 25 (1) | 25 (Y) | 50 (CS) |
| SCC-C6 | 20 (1) | 30 (Y) | 50 (CS) |

Testing of Stability and Antifoam Performance

The suds-controlling compositions were tested for stability in liquid detergent formulations, and some were tested for antifoam performance. The latter was satisfactory in all cases, having been tested according to standard test methods in a front loading washing machine.

A first liquid detergent formulation (LDF-1) was prepared by mixing 13% by weight of Nansa ® SS60, 13% Empicol ® KC7, 5% fatty acids, 5% oleic acid, 10% ethanol, 5% triethanolamine, 1.5% NaOH and the rest water. A second and third liquid detergent formulation (LDF-2 and LDF-3) were proprietary test formulations supplied by a detergent manufacturer.

The stability of the suds-controlling agent was tested by mixing into the liquid detergent formulations an amount of the suds-controlling compositions, storing some at room temperature, some at 40° C. and observing any lack of stability. In order to assess the instability better some formulations were loaded with much higher levels of suds-controlling compositions than would be used in normal commercial processes. Comparative examples were also run. In some cases the suds-controlling composition was aged for 2 days prior to adding it to the liquid detergent composition. For some formulations particle sizes of the suds-controlling composition in the liquid detergent formulation were checked. In general all exemplified compositions which were tested performed well. Any separation which occurred was easily redispersed upon agitation, while the comparative examples showed irreversible creaming, coalescence and sedimentation after a short time. This information was confirmed by examining separated layers and fresh samples under an optical microscope with image analyser, in which it was easy to differentiate between the irreversible processes of coalescence and the reversible process of separation. The separated layers which are acceptable in these tests (the proper dispersion procedure could be improved by improving the apparatus used), consist of loosely bound particles of suds-controlling compositions which can be easily redispersed. If coalescence occurred large amounts of silicone or a thick viscous film of silicone were seen on the surface, or alternatively aggregation of antifoam particles which could not be broken up were found at the bottom of the composition. Aging of the suds-controlling compositions prior to mixing them into the liquid detergent formulation did not seem to affect the particle size distribution but improved the stability. A few particular examples are given in detail below.

TABLE V

| Suds Control Composition (ADDITION %) | Liquid Detergent | Stability Results |
|---|---|---|
| SCC02 (25) | LDF-1 | some slight coalescence after |

TABLE V-continued

| Suds Control Composition (ADDITION %) | Liquid Detergent | Stability Results |
|---|---|---|
| SCC05 (2.5) | LDF-3 | several weeks beginning easily redispersed separation after 20 days at room temp. no coalescence |
| SCC10 (2) | LDF-1 | easily redispersed separation after 2 months at 40° C. no coalescence |
| SCC11 (1) | LDF-2 | no coalescence after more than 5 weeks at 40° C. |
| SCC13 (25) | LDF-2 | easily redispersed separation after 6 weeks at room temp. no coalescence |
| SCC14 (25) | LDF-2 | easily redispersed flocculation after 30 days at room temp. no coalescence |
| SCC21 (8) | LDF-1 | easily redispersed flocculation after 50 days at room temp. no coalescence |
| SCC23 (20) | LDF-2 | easily redispersed partial separation after 42 days at room temp. no coalescence. |
| SCC24 (12) | LDF-1 | easily redispersed very slow separation after 27 days at room temp. no coalescence |
| SCC25 (12) | LDF-1 | easily redispersed separation after 16 days at room temp. no coalescence |
| SCC46 (12) | LDF-1 | no coalescence or separation after 12 months at room temp. |
| SCC51 (25) | LDF-1 | easily redispersed separation after 2-3 weeks, no coalescence |
| SCC-C1 (10) | LDF-1 | separation, creaming and sedimentation within 1 minute |
| SCC-C2 (20) | LDF-1 | major coalescence within 30 minutes |
| SCC-C3 (20) | LDF-1 | major coalescence within 30 minutes |
| SCC-C4 (12) | LDF-1 | major coalescence after 1 day at 40° C. |
| SCC-C5 (25) | LDF-1 | major coalescence after 2 days at 40° C. |
| SCC-C6 (25) | LDF-1 | major coalescence after 2 days at 40° C. |

That which is claimed is:

1. A suds-controlling composition, which is liquid at 25° C., comprising
   (a) 100 parts by weight of a silicone antifoam which consists essentially of (i) a liquid branched polyhydrocarbyl siloxane material having at most 2 mole % branching, wherein at least 50% of all units present have the general formula $R_2$—Si—$O_{2/2}$, wherein R denotes a monovalent hydrocarbon group having up to 24 carbon atoms and wherein at least 2 units have the structure $RSiO_{3/2}$ or $SiO_{4/2}$, any other units having the formula

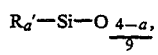

wherein a has a value of from 0 to 3 and R' is selected from the group consisting of monovalent hydrocarbon groups having up to 24 carbon atoms, hydrogen and hydroxyl and (ii) a finely divided filler having its surface rendered hydrophobic,
   (b) from 75 to 900 parts by weight of a polyorganosiloxane polyoxyalkylene copolymer, which is neither fully soluble in an aqueous surfactant solution nor fully soluble in the liquid polyhydrocarbyl siloxane (a) (i), and 200 to 400 parts by weight of a cyclic organopolysiloxane.

2. A suds-controlling composition according to claim 1 wherein the liquid branched polyhydrocarbylsiloxane is a loose network having from 0.1 to 2% branching points, based on the total number of siloxane units and in which the size of the majority of polymers linking two branching points is at least 250 siloxane units long.

3. A suds-controlling composition according to claim 2 wherein 85 to 300 parts of the copolymer (b) are used for every 100 parts of antifoam (a).

4. A suds-controlling composition according to claim 2 wherein the polyorganosiloxane polyoxyalkylene copolymer (b) has the general formula

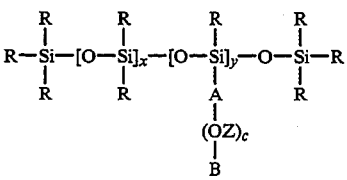

wherein R is selected from the group consisting of alkyl and aryl groups having up to 18 carbon atoms, A denotes a divalent alkylene unit having from 2 to 6 carbon atoms, optionally interrupted by an oxygen atom, B denotes a capping unit, Z denotes a divalent alkylene group having 2 to 8 carbon atoms, x, y and c have a value chosen thus that the copolymer is neither fully soluble in an aqueous surfactant solution, nor fully soluble in liquid polyorganosiloxane material (a)(i).

5. A suds-controlling composition according to claim 4 wherein at least 80% of all the R groups of the polyorganosiloxane polyoxyalkylene copolymers are methyl groups, A is selected from the group consisting of $C_2$ and $C_3$ alkylene units, at least 70% of all Z groups are a dimethylene group and B is selected from the group consisting of hydroxyl and acyl groups.

6. A suds-controlling composition according to claim 4 wherein in the polyorganosiloxane polyoxyalkylene copolymer the value of x+y is in the range of from 80 to 350, y/x+y is from 0.03 to 0.08 and c is in the range from 4 to 40.

7. A suds-controlling composition according to claim 4 wherein 85 to 300 parts of the copolymer (b) are used for every 100 parts of antifoam (a).

8. An aqueous surfactant composition comprising (A) from 10 to 50 parts by weight of a nonionic surfactant, (B) from 10 to 50 parts by weight of an anionic surfactant, (C) sufficient of a suds controlling composition, which is liquid at 25° C., and comprises (a) 100 parts by weight of a silicone antifoam which consists essentially of (i) a liquid branched polyhydrocarbylsiloxane material having at most 2 mole %, branching, wherein at least 50% of all units present have the general formula $R_2$—Si—$O_{2/2}$, wherein R denotes a monovalent hydrocarbon group having up to 24 carbon atoms and wherein at least 2 units have the formula

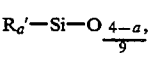

wherein R' is selected from the group consisting of monovalent hydrocarbon groups having up to 24 carbon atoms, hydrogen and hydroxyl and (ii) a finely divided filler having its surface rendered hydrophobic, and (b) from 75 to 900 parts by weight of a polyorganosiloxane polyoxyalkylene copolymer, which is neither fully soluble in an aqueous surfactant solution nor fully soluble in the liquid polyhydrocarbyl siloxane (a) (i) to give a silicone antifoam content of from 0.01 to 5% by weight based on the total weight of the aqueous surfactant, 200 to 400 parts by weight of a cyclic organopolysiloxane, and (D) water.

9. An aqueous surfactant composition according to claim 8 which is an unbuilt and unstructured liquid detergent composition.

10. An aqueous surfactant composition according to claim 8 wherein the liquid branched polyhydrocarbyl siloxane of the suds-controlling composition (C), is a loose network having from 0.1 to 2% branching points, based on the total number of siloxane units and in which the size of the majority of polymers linking two branching points is at least 250 siloxane units long.

11. An aqueous surfactant composition according to claim 10 which is an unbuilt and unstructured liquid detergent composition.

12. An aqueous surfactant composition according to claim 10 wherein the polyorganosiloxane polyoxyalkylene copolymer (b) of the suds-controlling composition (C), has the general formula

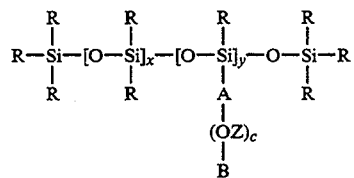

wherein R is selected from the group consisting of alkyl and aryl groups having up to 18 carbon atoms, A denotes a divalent alkylene unit having from 2 to 6 carbon atoms, optionally interrupted by an oxygen atom, B denotes a capping unit, Z denotes a divalent alkylene group having 2 to 8 carbon atoms, x, y and c have a value chosen thus that the copolymer is neither fully soluble in an aqueous surfactant solution, nor fully soluble in liquid polyorganosiloxane material (a)(i).

13. An aqueous surfactant composition according to claim 10 wherein at least 80% of all the R groups of the polyorganosiloxane polyoxyalkylene copolymer (b) of the suds-controlling composition (C) are methyl groups, A is selected from the group consisting of $C_2$ and $C_3$ alkylene units, at least 70% of all Z groups are a dimethylene group and B is selected from the group consisting of hydroxyl and acyl groups.

14. An aqueous surfactant composition according to claim 13 which is an unbuilt and unstructured liquid detergent composition.

15. An aqueous surfactant composition according to claim 10 wherein in the polyorganosiloxane polyoxyalkylene copolymer (b) of the suds-controlling composition (C) the value of x+y is in the range of from 80 to 350, y/x+y is from 0.03 to 0.08 and c is in the range from 4 to 40.

16. An aqueous surfactant composition according to claim 10 wherein in the suds-controlling composition (C) 85 to 300 parts of the copolymer (b) are used for every 100 parts of antifoam (a).

* * * * *